United States Patent
Ranta et al.

(10) Patent No.: US 6,556,247 B1
(45) Date of Patent: Apr. 29, 2003

(54) METHOD AND SYSTEM FOR DECODING DATA IN THE HORIZONTAL OVERSCAN PORTION OF A VIDEO SIGNAL

(75) Inventors: Craig S. Ranta, Redmond, WA (US); Leonardo G. Del Castillo, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/475,834

(22) Filed: Dec. 30, 1999

(51) Int. Cl.7 ................................................. H04N 7/08
(52) U.S. Cl. ........................ 348/476; 348/460; 348/522
(58) Field of Search .............................. 348/460, 465, 348/473, 476, 552

(56) References Cited

U.S. PATENT DOCUMENTS

| | | | |
|---|---|---|---|
| 3,493,671 A | 2/1970 | Houghton | |
| 3,743,767 A | 7/1973 | Bitzer | |
| 3,891,792 A | 6/1975 | Kimura | |
| 3,900,887 A | 8/1975 | Soga | |
| 3,993,861 A | 11/1976 | Baer | |
| 4,186,413 A | 1/1980 | Mortimer | 358/146 |
| 4,207,704 A | 6/1980 | Akiyama | |
| 4,368,486 A | * 1/1983 | Degoulet et al. | 358/146 |
| 4,540,176 A | 9/1985 | Baer | 273/148 |
| 4,599,644 A | 7/1986 | Fischer | |
| 4,638,359 A | 1/1987 | Watson | 358/147 |
| 4,660,033 A | 4/1987 | Brandt | 340/825 |
| 4,665,431 A | 5/1987 | Cooper | 358/145 |
| 4,729,563 A | 3/1988 | Yokoi | 273/1 |
| 4,771,344 A | 9/1988 | Fallacaro et al. | |
| 4,807,031 A | 2/1989 | Broughton et al. | |
| 4,840,602 A | 6/1989 | Rose | 446/175 |
| 4,846,693 A | 7/1989 | Baer | |
| 4,847,699 A | 7/1989 | Freeman | |
| 4,847,700 A | 7/1989 | Freeman | |
| 4,855,827 A | * 8/1989 | Best | 358/143 |
| 4,862,268 A | 8/1989 | Campell et al. | 358/141 |

(List continued on next page.)

FOREIGN PATENT DOCUMENTS

| | | | |
|---|---|---|---|
| EP | 0710022 A2 | 5/1996 | |
| EP | WO 99 00979 A | 1/1999 | |
| WO | WO 91/10490 | 7/1991 | |
| WO | WO 92/19073 | 10/1992 | |
| WO | WO 93/18614 | 9/1993 | ............ H04N/7/00 |
| WO | WO 93/23955 | 11/1993 | ............ H04N/7/08 |
| WO | WO 94/24820 | 10/1994 | .......... H04N/7/087 |
| WO | WO 00/44460 | 8/2000 | |

OTHER PUBLICATIONS

U.S. patent application Ser. No. 09/476,291, Ranta et al.
U.S. patent application Ser. No. 09/475,832, Ranta et al.
U.S. patent application Ser. No. 09/476,177, Ranta et al.

*Primary Examiner*—Victor R. Kostak
(74) *Attorney, Agent, or Firm*—Ronald M. Anderson (57) ABSTRACT

The present invention relate to method and apparatus for processing a video signal to decode data previously encoded into the video signal. One aspect of the invention relates to a method for detecting a first line of a data sequence encoded in a digital video signal by scanning a digital video signal by line to look for an intelligent signal detect word. If the detect word is not found, a counter is incremented. Scanning continues until the intelligent signal detect word is found, and once found flagging that line as a first data line. Another aspect of the invention is a decoding apparatus that searches the plurality of horizontal scan lines in a video signal for the presence of a data start key, and when such a data start key is found, the line containing the data start key is identified as the first line of the encoded data.

22 Claims, 7 Drawing Sheets

U.S. PATENT DOCUMENTS

| | | | |
|---|---|---|---|
| 4,864,607 A | 9/1989 | Mitamura et al. | 379/388 |
| 4,930,019 A | 5/1990 | Chu | 358/335 |
| 4,949,327 A | 8/1990 | Forsse et al. | 369/58 |
| 4,969,041 A * | 11/1990 | O'Grady et al. | 348/142 |
| 5,021,878 A | 6/1991 | Lang | |
| 5,108,341 A | 4/1992 | Desmet | |
| 5,198,893 A | 3/1993 | Lang | 358/93 |
| 5,243,423 A * | 9/1993 | DeJean et al. | 358/142 |
| 5,255,097 A | 10/1993 | Spiero et al. | 358/181 |
| 5,270,480 A | 12/1993 | Hikawa | |
| 5,371,545 A | 12/1994 | Tults | 348/465 |
| 5,398,071 A | 3/1995 | Gove et al. | 348/558 |
| 5,402,419 A | 3/1995 | Osakabe et al. | 370/85.1 |
| 5,450,134 A * | 9/1995 | Legate | 348/467 |
| 5,453,794 A | 9/1995 | Ezaki | 348/461 |
| 5,453,795 A | 9/1995 | Tults | 348/465 |
| 5,463,423 A | 10/1995 | Tults | 348/465 |
| 5,483,289 A | 1/1996 | Urade et al. | 348/468 |
| 5,561,469 A | 10/1996 | Schultz | 348/476 |
| 5,629,738 A | 5/1997 | Kim | 348/465 |
| 5,655,945 A | 8/1997 | Jani | |
| 5,703,658 A | 12/1997 | Tsuru et al. | 348/554 |
| 5,752,880 A | 5/1998 | Gabai et al. | 463/1 |
| 5,808,689 A | 9/1998 | Small | 348/476 |
| 5,812,207 A | 9/1998 | Cahill, III | 348/465 |
| 5,977,951 A | 11/1999 | Danieli et al. | 345/156 |
| 6,005,632 A | 12/1999 | Cahill, III | 348/465 |
| 6,057,889 A | 5/2000 | Reitmeier et al. | 348/555 |
| 6,072,532 A | 6/2000 | Chieh et al. | 348/478 |
| 6,229,572 B1 * | 5/2001 | Ciardullo et al. | 348/473 |
| 6,281,939 B1 | 8/2001 | Del Castillo et al. | 348/558 |
| 6,377,308 B1 | 4/2002 | Cahill, III | 348/461 |
| 6,415,439 B1 | 7/2002 | Randell et al. | 725/153 |

* cited by examiner

METHOD AND SYSTEM FOR DECODING DATA IN THE HORIZONTAL OVERSCAN PORTION OF A VIDEO SIGNAL

REFERENCE TO RELATED APPLICATIONS

This application incorporates by reference U.S. application Ser. No. 08/885,385 entitled "METHOD AND SYSTEM FOR ENCODING DATA IN THE HORIZONTAL OVERSCAN PORTION OF A VIDEO SIGNAL" filed on Jun. 30, 1997, which is assigned to a common assignee. This application further incorporates by reference U.S. application entitled "SYSTEM AND METHOD OF ADAPTIVE TIMING ESTIMATION FOR HORIZONTAL OVERSCAN DATA," which is assigned to a common assignee and filed concurrently herewith.

TECHNICAL FIELD

The present invention relates to wireless communication systems and, more particularly, relates to retrieving data encoded in the horizontal overscan portion of a video signal.

BACKGROUND OF THE INVENTION

A variety of consumer products available today rely upon the use of wireless communication. Examples include cordless phones, garage door openers, remotely controlled appliances, and remotely controlled toys. A common motivation that drives manufacturers of these and similar products is minimizing the cost associated with providing the wireless communication capability. Thus, techniques for minimizing the cost of radio equipment for transmitting and receiving radio frequency signals while maintaining reliable communication are continuously explored.

Interactive toys, games, and learning products for the home could be particularly useful applications of wireless communication technology. Wireless systems eliminate the use of wire-line communication links and, therefore, are preferable for many household applications. For example, wireless toys, games, and learning products eliminate wires that small children might tangle or pull free, or that dogs might chew. Wireless products also avoid the need for universal plugs or adapters and allow a large number of wireless devices to be controlled by a single controller without requiring a large terminal port for plugging-in the controlled devices. Wireless communication links are therefore safer, more robust, more versatile, and in many cases less expensive than wire-line communication links.

Control data must be provided to the controller, which in turn transmits the control data to the controlled devices through a local wireless communication link. Although the control data may be generated locally, for example by a computer located in close proximity to the controller, it is also desirable to transmit the control data from a remote location using a broadcast-level communication link, such as an air-wave or cable television signal. In particular, it would be advantageous to broadcast the control data along with a standard video signal for driving a display device, such as a television or monitor. In this manner, the controlled devices may be caused to operate in synchronism with the programming information defined by the video signal. For example, a controlled device may operate as a character in a video program displayed on the television or monitor.

In order to effectively broadcast the control data in connection with a video signal, several often competing objectives should be attained. First, as noted above, the control data should be temporarily synchronized with the video signal so that the actions of the controlled devices operate in synchronism with the programming information displayed on the television or monitor. Second, the control data should be easily concatenated with a standard video signal for transmission in a variety of broadcast media using standard equipment. Third, the control data should not interfere with the video signal or visibly disrupt the display of the video signal. Fourth, sufficient bandwidth should be provided in the upstream communication link (e.g., a broadcast-level communication link) to fully satisfy the bandwidth requirements of the downstream communication link (e.g., local wireless communication link). In addition, it would be advantageous for additional bandwidth to be available in the upstream communication link for transmitting additional information to provide advertising, subscription, or emergency warning services, such as e-mail, foreign language subtitling, telephone pages, weather warnings, configuration data for a set-top box, and so forth.

When control data is broadcast in connection with a video signal, the control data is typically converted to a series of digital packets. A subset of the data bits in each packet is then concatenated with a single line of the video signal, which is in turn digitally transmitted to the controller. Conversion of the control data and video signal into a digital format (as opposed to the analog format often used for video signals) ensures that the control data is easily received and understood by the controlled device. However, the conversion of a video signal from an analog to a digital format introduces certain problems. During transmission or receipt of the signal, the lines comprising the video signal may shift from their original intended position. While these problems have little or no effect on the visible portion of the video signal, they severely disrupt the concatenated control data. Because the control data is transmitted as a sequential series of discrete packets, inverting or otherwise shifting the order of receipt of these packets may render the control data unusable. For example, presume that a control data element is divided into three packets, which when taken together instruct a controlled device to play a specific sound. If these three packets are received sequentially (that is, packet one, two, and then three) then the controlled device performs its task properly. However, if the packets are received in a different order (for example, two, one, and three), then the signal comes across as gibberish.

Thus, there is a need in the art for a method for receiving a control data signal in the order in which the signal was transmitted. There is a further need in the art for a means for detecting when a control data signal has been scrambled during transmission. There is a final need for a means for reordering a scrambled control data signal.

SUMMARY OF THE INVENTION

The present invention meets the needs described above by providing a method and system for retrieving and reordering control data in the horizontal overscan portion of a video signal. Because the control data is concatenated with the video signal on a line-by-line basis, the control data is temporarily synchronized with the underlying video signal. This permits the controlled devices, such as wireless mechanical characters, to behave as characters in a scene defined by the programming information of the video signal.

Generally described, the invention provides a method for retrieving and reordering control data in a video signal that includes a series of fields that each include a number of lines. The encoded data is concatenated with the lines of the video signal to create an encoded video signal, which is configured to define content data in association with each field. The content data is configured to define a first address associated with a first device, device-specific control data for the first device, a second address associated with a second device, and device-specific control data for the second device. In response to the first address, the device-specific control data for the first device is routed to the first device and the actions of the first device are controlled accordingly. Similarly, in response to the second address, the device-specific control data for the second device is routed to the second device and the actions the second device are controlled accordingly.

The video signal typically defines programming information including a scene displayed on a display device. The device-specific control data for the first device typically includes voice and motor control data that causes the first device to behave as a character in the scene displayed on the display device. The device-specific control data for the second device may be voice or motor control data that causes the second device to behave as a second character in the scene displayed on the display device, electronic mail for a transmission to a computer system, intercom information for transmission to an intercom system, telephone paging information for transmission to a paging system, or language translation information, advertising information, subscription information, or emergency warning information displayed on the display device. Many other specific applications will be apparent to those skilled in the art.

The encoded data may include signal detection words and content words. Each signal detection word and each content word may include data bits and error correction bits that are used to correct errors in the data bits. Specifically, the error correction bits may define a correction sequence that allows a single-bit error in the data bits to be detected and corrected. Each signal detection word may include four data bits and three error correction bits, and each content word may include nine data bits and seven error correction bits.

According to another aspect of the invention, an intelligent signal detection word (ISDW) may be encoded into each field of the video signal such that a consecutive series of the signal detection words defines a dynamic validation sequence. For this sequence, each intelligent signal detection word varies in at least two bits from the immediately preceding intelligent signal detection word. For example, the dynamic validation sequence transmitted in consecutive fields of a two-field interlaced field of the video signal may include the binary representation of 8, 1, 10, 3, 12, 5, 14, 7. The dynamic validation sequence of the ISDWs repeats the same pattern. Thus, the exemplary invention may scan a series of lines for the first ISDW of the dynamic validation sequence. When found, the invention may thus recognize that the line upon which the first ISDW of the dynamic validation sequence is located is also the first line containing a control data packet, and accordingly shift that line to the proper location. This allows the invention to determine when lines have been shifted during transmission, and take steps accordingly to reconstruct the control data signal in such a manner that the data is not lost and is recognizable by a controlled device.

The encoded data is defined by line signals located in the horizontal overscan portion of a video signal. Specifically, each line signal may be a pre-visible pulse located between the color burst portion and the visible raster portion of a horizontal scan line of the video signal. Each pulse may define a single bit of the encoded data, in which case the encoded data of each field of a two-field interlaced frame of the video signal may define one 7-bit signal detection word and 13 16-bit content words. To increase the bandwidth of the encoded data transmission, each line signal may include both a pre-visible pulse and a post-visible pulse located after the visible raster portion and before the horizontal blanking interval. To further increase the bandwidth of the encoded data transmission, each pulse may be modulated to define several bits.

The invention also provides an encoded video signal, which is created according to the method described above, and a system for creating and using the encoded video signal. The system includes a video data encoder that is functionally connected to a video source that provides a video signal, such as an NTSC television signal. The video data encoder receives the video signal, which includes a series of fields that each include a number of lines. The video data encoder concatenates encoded data with the lines of the video signal to create the encoded video signal.

The video data encoder is functionally connected to data decoder that receives the encoded video signal from the video data encoder. The data decoder detects the presence of the signal detection data, extracts the content data from the encoded video signal, and assembles the content data into a serial data communication signal. The video data decoder further scans each line for the presence of the first ISDW of the dynamic validation sequence. Upon finding the first ISDW in the dynamic validation sequence, the data encoder sets the position of the line containing the first ISDW to coincide with the position occupied by the first line containing a control data packet. All video line are shifted by the same amount, in order to ensure signal continuity. This may involve vertically shifting lines within a single video field, swapping the positions of entire video fields, or a combination of both.

The data decoder is functionally connected to a data error processor that receives the serial data communication signal from the data decoder. The data error processor parses the serial data communication signal into data bits and error corrections bits, analyzes the error correction bits to detect errors in the data bits, corrects detected errors in the data bits, and assembles the corrected data bits into an error corrected data stream.

That the invention improves over the drawbacks of the prior art and accomplishes these advantages will become apparent from the following detailed description of the exemplary embodiments and the appended drawings and claims.

DETAILED DESCRIPTION

An exemplary embodiment of the invention is a system for retrieving and reordering control data encoded in the horizontal overscan area of a video signal. Because the control data is concatenated with the video signal on a line-by-line basis, the control data is temporarily synchronized with the underlying video signal. This allows the controlled devices, such as wireless mechanical characters, to behave as characters in a scene defined by the programming information of the video signal. The protocol for the encoded control data is addressable, forwardly compatible, error tolerant, and feasible to deploy in connection with a system that is primarily intended to be a children's entertainment product. An analog video signal is typically divided into two fields, each of which contains a plurality of lines. These lines are analogous to a single row of luminescence displayed on a television. Thus, the typical television display may be thought of as a series of lines, broken up into two fields. The two fields are interlaced, such that every other line belongs to the same field. A portion of each field falls within a horizontal overscan region. This region is the portion of a display device's screen which cannot be visibly perceived. For example, on a television the first several lines of each field are hidden from the user; they cannot be seen in any manner. Control data for controlled devices are concatenated with the lines making up the horizontal overscan region.

Encoded control data must be retrieved by a controlled device in the same order in which the data is transmitted, or the data is worthless. For example, if two lines of the underlying video signal are swapped in transmission, the control data may become meaningless, insofar as the first portion of a data string may be received after the second portion of the same string.

EXEMPLARY EMBODIMENT OF THE PRESENT INVENTION

The present invention may be deployed in a wireless communication environment that includes a controller (also referred to as a master device) that communicates with and controls one or more controlled devices (also referred to as slave devices) on a single radio-frequency (RF) communication channel. A specific embodiment of the invention is known as the "REALMATION" system. "REALMATION," derived from combining the words "realistic" and "animation," is descriptive of a technology developed by Microsoft Corporation of Redmond Washington. A controller in a typical "REALMATION" system includes a computer system with a display device and a wireless modem that communicates with and controls one or more controlled devices, such as animated mechanical characters. The controller drives a display device to depict programming information, such as scenes of an audio/video presentation, while simultaneously transmitting control data, including voice coefficients and motion vectors, to one or more mechanical characters. The mechanical characters, in response to receiving the control data, move and talk as characters in the scenes depicted on the display device.

The "REALMATION" product line includes two main components: a controller (i.e., master device) known as the "REALMATION CONTROLLER," and one or more controlled devices (i.e., slave devices) known as "REALMATION PERFORMERS." A controlled device may be specially designed for a specific industrial, educational, research, entertainment, or other purpose. For example, a controlled device such as the "BARNEY" dinosaur character is specially designed for a learning and entertainment system for small children. Each controlled device includes an RF receiver system for receiving, demodulating, and decoding signals transmitted by the controller. The signals transmitted by the controller contain control data, such as speech coefficients and motion vectors. This control data is transmitted in a specific order to the controlled device, to elicit specific actions on the part of the controlled device. The control data causes the controlled device to behave as a character in a scene depicted on a display device driven by the controller, presuming the control data is correctly ordered upon receipt by the controlled device.

In a duplex environment, each controlled device may also include an RF transmitter system for encoding, modulating, and transmitting response signals back to the controller. These response signals may include test or receptor data defining status information concerning the controlled device. For example, a controlled device may include pressure or light sensitive receptors for receiving user input, such as squeezing or covering a part of the character. This is particularly useful in an interactive learning environment in which a child interacts with the controlled device. For example, the controller may direct a "BARNEY" controlled device to say, "Please squeeze my left hand." The controlled device may then transmit the child's response back to the controller, which responds accordingly. For example, if the child squeezes the controlled device's right hand, the controller may direct the controlled device to say, "No, that's my right hand, please squeeze my left hand."

The controller includes a data source that receives or generates video data and related control data so that one or more controlled devices may behave as characters in a scene depicted on a display device. To do so, the control system includes a wireless modem (or wireless modulator for a simplex environment), known as the "REALMATION LINK MASTER," and a display device, such as a television or a computer monitor. The data source may be an active device, such as computer system or an interactive television system, that generates the video data and related control data in real-time. Alternatively, the data source may be a passive device, such as a cable system, VCR, or television broadcast signal, that feeds a previously-created data stream including video data and encoded control data to the wireless modem. In this case, the wireless modem extracts the control data from the data stream, feeds the video data to the display device, and broadcasts the control data to one or more controlled devices. The wireless modem or modulator further contains a control data retrieval system for detecting and properly ordering encoded control data. This eliminates both field swapping and vertical shifting, described with respect to FIG. 3.

In addition, the controller may be an intelligent system that is operative to generate, select, and combine video and control data from a number of sources in response to user input or other control signals. Regardless of the configuration, some type of data source provides a data stream including video and related control data, and the wireless modem extracts the control data from the video data, detects the presence of an intelligent signal detect word (ISDW), orders the control data according to the transmission order as exemplified by the ISDW, routes the video data to the display device, and broadcasts the control data to one or more controlled devices. To broadcast control data, the wireless modem encodes the control data into a special differential-pulse data modulation (DDM) format and transmits the DDM-encoded control data to the controlled devices. In addition, the wireless modem may receive DDM-encoded response signals from the controlled devices and decode the response signals.

The "REALMATION" product line may operate in a simplex environment or in a duplex environment, although the exemplary embodiment is described in the context of a simplex environment. The operation of exemplary embodiments of the controller, the wireless modulator (or modem), and the controlled devices in these environments will be described in the context of programs running on microprocessor-based computer systems. Those skilled in the art will recognize that implementations of the present invention may include various types of program modules, use various programming languages, and be operable with various types of computing equipment. Additionally, although the descriptions of exemplary embodiments describe the controller as communicating with a controlled device over an RE communication channel, those skilled in the art will appreciate that substitutions to the RF communication channel can include other communication mediums such as fiber optic links, copper wires, infrared signals, etc.

Figure 1:
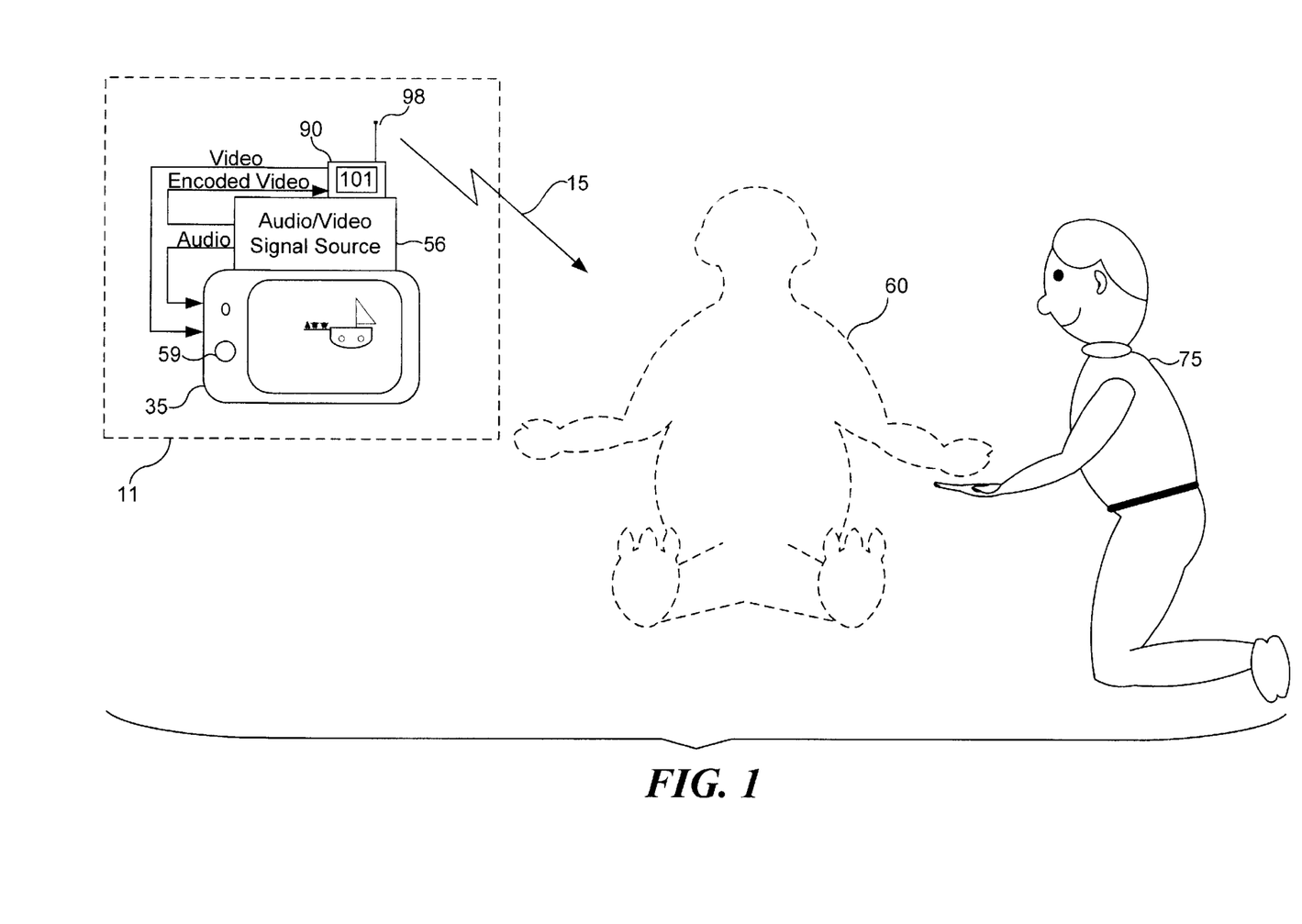
FIG. 1 is a block diagram of a simplex wireless control environment including a controller and a controlled device.
Figure 2:
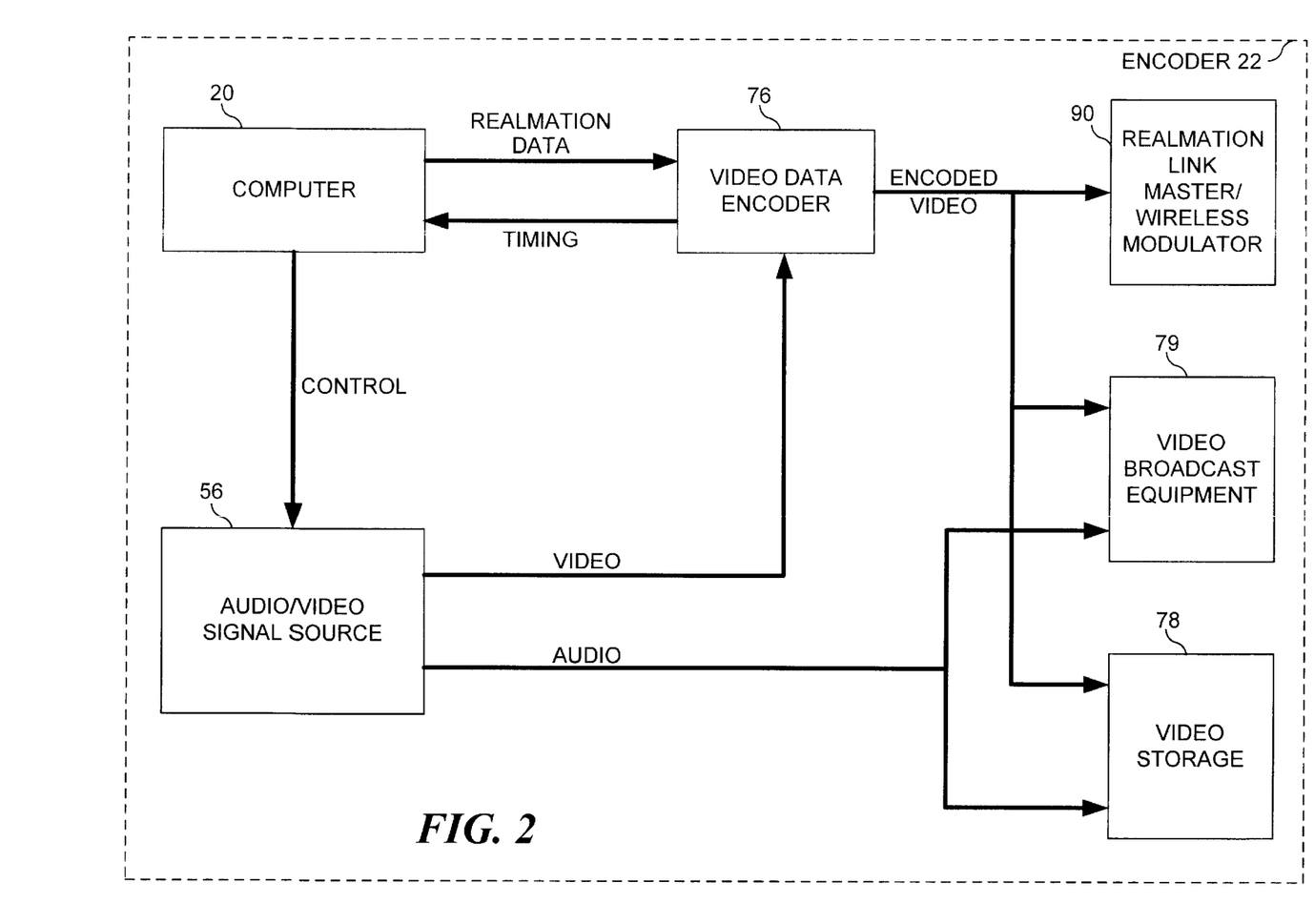
FIG. 2 is a block diagram illustrating a system for creating a data stream including video data and encoded control data.
Figure 3:
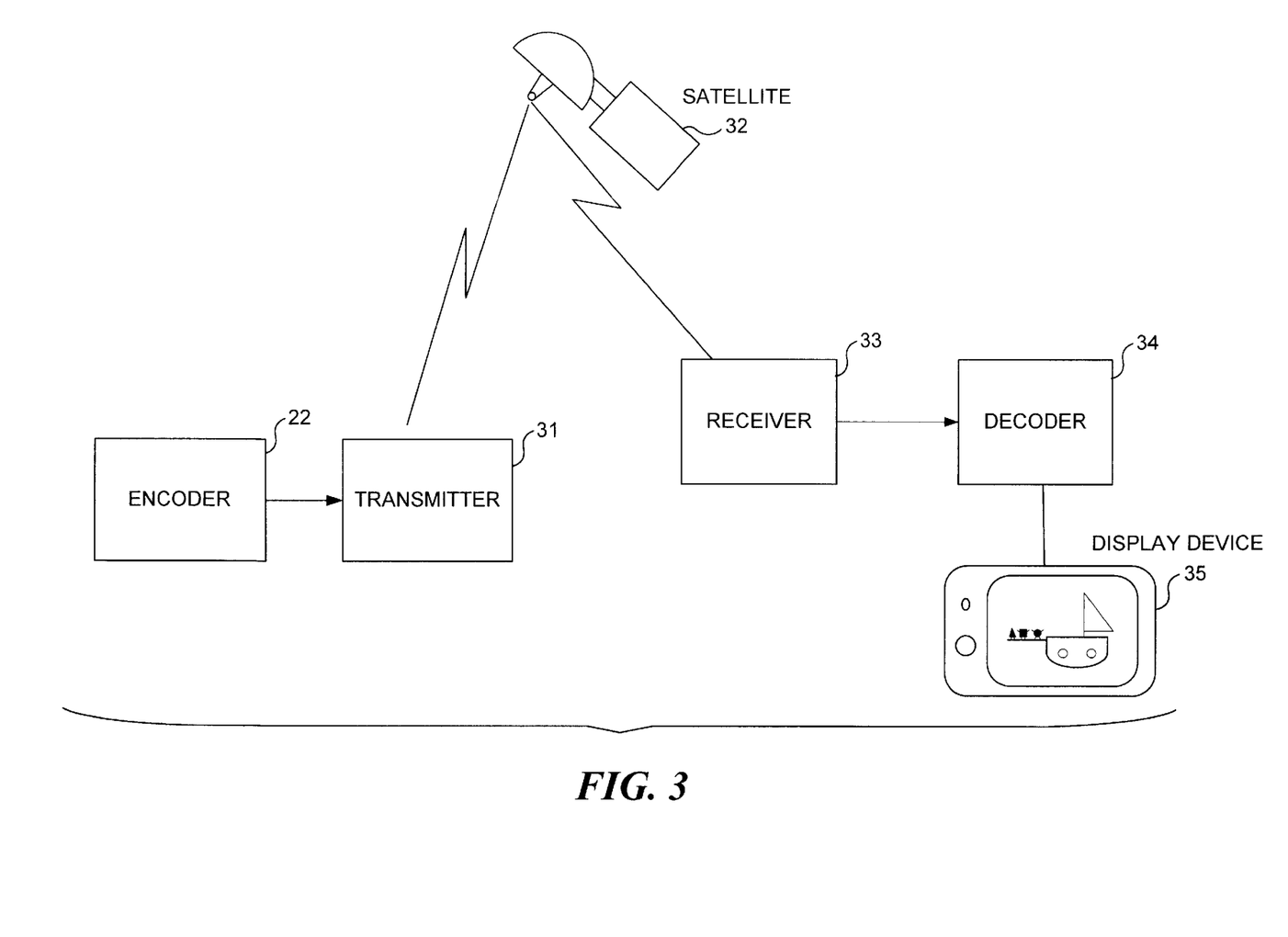
FIG. 3 is a block diagram illustrating a system for digitizing, encoding and transmitting control data.

Referring now to the drawings, in which like numerals represent like elements throughout the several figures, aspects of the present invention and exemplary operating environments will be described. Reference is made to FIGS. 1–3 below to provide a description of suitable environments in which the invention may be implemented. Reference is then made to FIGS. 4–9 to describe the preferred wireless communication protocol for controllers and controlled devices in these environments.

Operating Environment

FIG. 1 illustrates an exemplary simplex environment for embodiments of the present invention. This simplex environment may be operated as a learning and entertainment system for a child. The simplex environment includes a controller 11 that controls a controlled device 60. The controller 11 includes an audio/video signal source 56, a wireless modulator 90, an antenna 98, and a display device 35 including a speaker 59. The controller 11 transmits control data to the controlled device 60 via an antenna 98 and an RF communication channel 15. To accomplish this task, the wireless modulator 90 interfaces with the audio/video signal source 56 and the display device 35 through a standard video interface. Over this standard video interface, the wireless modulator 90 receives a video signal encoded with control data (encoded video) from the audio/video signal source 56. The wireless modulator 90 extracts the control data from the encoded video signal, and then transfers the control data to a controlled device 60 through the RF communication channel 15.

In addition, the wireless modulator 90 passes the video signal to the display device 35. The audio/video signal source 56 also interfaces with the speaker 59 in the display device 35 over this interface, the audio/video signal source 56 provides audio for an audio/visual presentation. Thus, a child can observe the audio/visual presentation on the display device 35 and the speaker 59 while the wireless modulator 90 transmits control data to one or more controlled devices 60. The reception of the control data causes the controlled device 60 to move and talk as though it is a character in the audio/visual presentation.

As mentioned above, the movement and speech of the controlled 30 device 60 is dependent on the controlled device receiving control data in the order in which the control data was transmitted. The control data module 101 monitors each line of the horizontal overscan portion of the video signal for the presence of an ISDW. Each line containing encoded data also contains an ISDW. In the exemplary embodiment, the ISDW pattern (discussed further with respect to FIGS. 7 and 8) repeats every six lines. Further, in the exemplary embodiment the first line of the video signal containing encoded control data is line 23 of Field 1. By knowing the ISDW pattern corresponding to line 23 of Field 1, the control data module 101 may scan each line within the horizontal overscan region in turn in order to detect the first line containing encoded data. In the event that the first line containing encoded data is not located at line 23 of Field 1, the control data module may further reorder the fields or lines based on the proper ISDW pattern. This process is more fully discussed with respect to FIG. 9.

There is no need to modify the encoded video signal before passing it to the display device 35. Typically, the controller 11 receives the encoded video signal, which is a standard video signal that has been modified to include digital information in the horizontal overscan intervals of the scan lines, which are invisible to the display device 35. Thus, the display device 35 can receive and display the encoded video signal without modification. The controller 11 only needs to extract the control data from the encoded video signal and generate the RF-modulated control signals for transmission to the controlled device 60.

Creating and Transmitting an Encoded Video Data Stream

FIG. 2 is a block diagram illustrating a system for creating, transmitting, receiving and properly ordering an encoded video data stream including video data and encoded control data, embodied as an "encoder" 22. The encoder 22 may be comprised of discrete hardware or software elements, or may represent a single physical unit.

A variety of sources, including but not limited to, a video cassette recorder or player, a cable reception box, a TV tuner, a laser disc player, or a computer with a video output, may provide the encoded video. In FIG. 2, the computer system 20 interfaces with a video data encoder 76 and an audio/video signal source 56. The audio/video signal source 56 provides two output signals: video and audio. These output signals may include live camera feeds, prerecorded playbacks, broadcast reception, etc. The computer system 20 controls the operation of the audio/video source 56 via a control signal. The control signal gates the output of the video and audio signals from the audio/video signal source 56.

The computer system 20 also provides the control data, which is encoded onto the video signal. The computer system 20 transfers the control data and gates the video signal to the video data encoder 76. The video data encoder combines the video signal and the control data by encoding the control data onto the video signal (i.e., generating an encoded video data stream). This encoding technique includes modulating the luminance of the horizontal overscan area of the video signal on a line-by-line basis. For example, the overscan area of each scan line may be modulated to represent a single control data bit. Furthermore, the field boundaries of the video signal provide a framing structure for the control data, in which each field contains a fixed number of data words.

More specifically, each field of the video signal contains a intelligent signal detect word (ISDW) consisting of four bits. The value of the intelligent signal detect word in each contiguous field cyclically, sequences through a defined set of values. The presence of the ISDW distinguishes an encoded video signal from a normal video signal. In a normal video signal, random noise appears in place of the intelligent signal detect word. A decoder attempting to recover control data from an encoded video signal therefore determines whether the signal is an encoded video signal by detecting the presence of the ISDW. Thus, the intelligent signal detect word provides an additional layer of integrity to the recovered control data beyond that of simple checksum error detection.

Still with respect to FIG. 2, the wireless modulator 90 receives the encoded video signal from the audio/video signal source 56 and recovers the control data from the encoded video signal. The wireless modulator 90 then transmits the control data to one or more controlled device, represented by the controlled device 60 shown in FIG. 4. Alternatively, video broadcast equipment 79 may receive the encoded video signal along with the audio signal and then broadcast the signals to one or more remotely located wireless modulators and/or wireless modems. In another alternative, video storage equipment 78 may receive the encoded video signal along with the audio signal and then store the signals in a storage medium for future retrieval.

FIG. 3 displays an exemplary environment for transmitting an encoded video signal. The encoder 22 converts an audio/video signal (hereinafter, the "video signal") into a digital format, and concatenates the video signal with encoded control data. This process was discussed with respect to FIG. 2. The encoder then passes the encoded signal to a transmitter 31 in a completely digital format.

The transmitter 31 relays the signal from the broadcast location to receiver 33, located at a receiving location. Oftentimes, a satellite 32 serves as a relay, receiving data from the transmitter 31 and broadcasting the encoded digital video signal to the receiver 33. The receiver in turn passes the encoded digital video signal to a decoder 34, typically located at the receiving location. Alternate embodiments may place the decoder at any point between the receiver 33 and display device 35, such as at the end user's premises. Once the video signal is decoded, the decoder 35 transmits the analog video signal, with encoded control data, to the user's display device 35.

At any point along the transmission route outlined in FIG. 3, two errors may occur, either of which renders the encoded control data useless. First, lines within a single field may be shifted either up or down from their intended location. This causes the picture displayed by the display device 35 to begin on an incorrect scan line. This phenomenon is referred to as "vertical shifting." The second possible problem is known as "field swapping." When field swapping occurs, field one and field two of the video signal are reversed, such that all even lines are displayed as odd lines, and vice versa. While neither of these has marked effects on the quality of a transmitted video signal, either or both may destroy the integrity of the concatenated control data.

Receiving and Reordering an Encoded Video Signal

Figure 4:
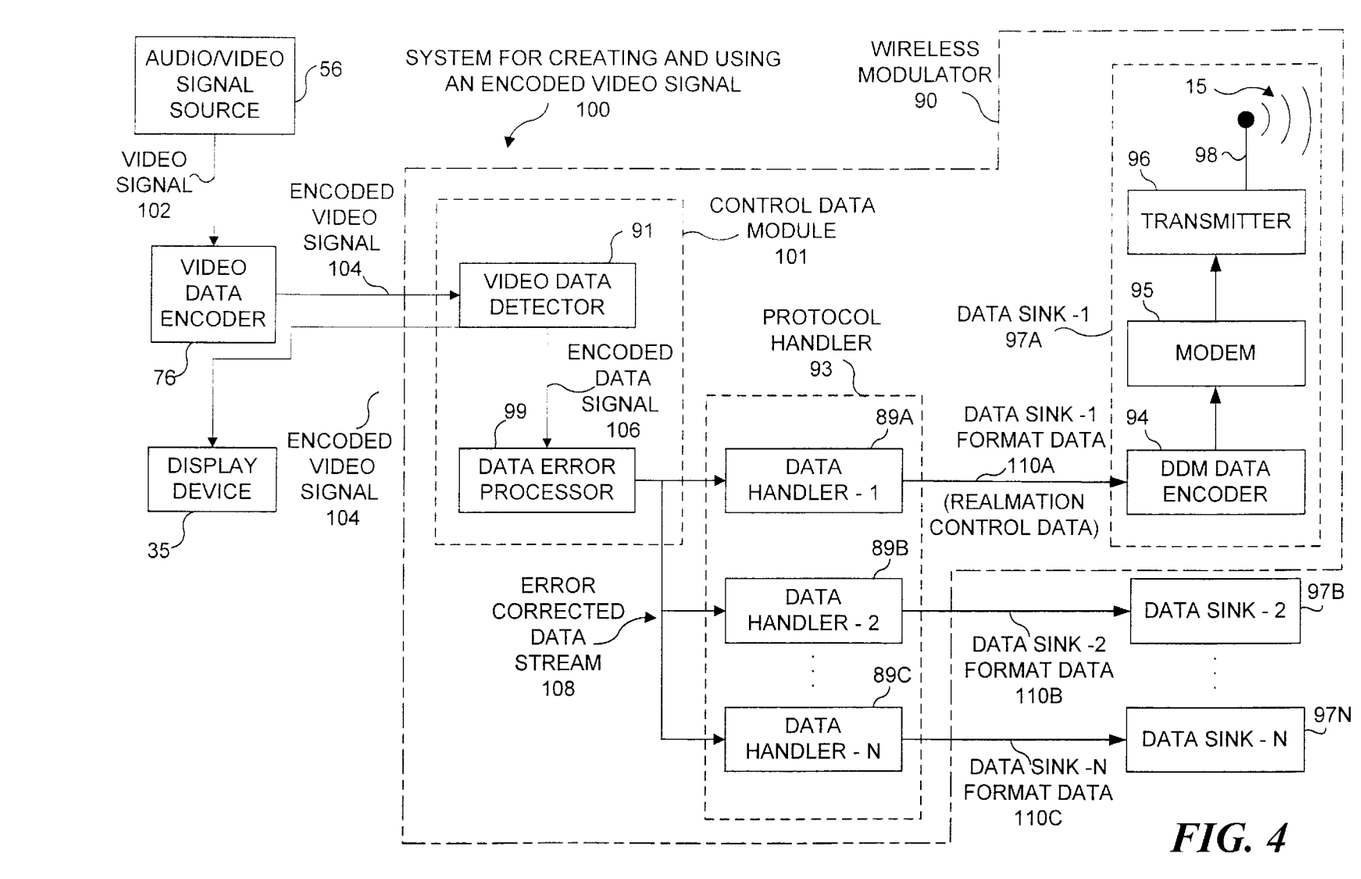
FIG. 4 is a functional block diagram of a control data retrieval system.

FIG. 4 is a functional block diagram of a control data retrieval system 100, embodied in a wireless modulator 90, operative to receive and reorder control data encoded in a video signal. Each of the components of the wireless modulator 90 may be implemented as a hardware or software module, or as a combination of both. The modulator 90 receives an encoded video signal 104 provided by a video data encoder 76. The video data encoder generates the encoded video signal by concatenating control data with a video signal 102 generated by an audio/video signal source 56.

The audio/video signal source 56 may be any of a variety of conventional video sources, such as a video camera, a broadcast or cable television signal, a video tape player, the Internet transmitting a video signal, a computer generating a video signal, and so forth. The video signal 102 may be any type of video signal that includes a plurality of fields that each include a plurality of scan lines. For example, the video signal 102 may be a standard 525-line, two-field interlaced NTSC television signal that includes 30 frames per second, each frame including two fields of 262.5 interlaced lines, as is well known to those skilled in the art.

In an exemplary embodiment, the control data module 101 is responsible for not only receiving the encoded video signal 104, but also for determining whether the encoded control data has been received in the same order in which the video data encoder 76 encoded the control data on the video signal. Further, the control data module 101 reorders the lines and fields comprising the encoded video signal 104 as necessary to reconstruct the transmission order intended by the video data encoder. The control data module 101 comprises two components, a video data detector 91 and a data error processor 99.

The video data detector 91 receives the encoded video signal 104, which may be a remote device that receives the encoded video signal 104 by way of a broadcast-level transmission. Alternatively, video data detector 91 may be a local device, for example in an intercom application. The encoded data does not interfere with the transmission of the underlying video signal 102. Thus, the encoded video signal 104 may be transmitted using any type of video transmission media, such as a broadcast-level cable television signal, a video tape player, the Internet transmitting a video signal, a computer generating a video signal, and so forth. In addition, because the encoded data is located in the pre-visible or post-visible portions of the video signal 102, the encoded data does not visibly interfere with the operation of typical televisions or monitors.

Therefore, the encoded video signal 104 may be passed directly from the video data detector 91 to the display device 35, which displays the underlying video signal 102 undisturbed by the encoded data.

The video data detector 91 detects the presence of the encoded data in the encoded video signal 104 by detecting the presence of an intelligent signal detection word (ISDW), as described with reference to FIGS. 7 and 8. Preferably, a single ISDW is transmitted in the same location of each field of the encoded video signal 104, such as lines 23–29 in field-1 and 286–292 in field-2, of a standard interlaced 525-line NTSC television signal. A consecutive series of the ISDWs defines a dynamic validation sequence in which each ISDW varies in at least two bits from the immediately preceding signal detection word. For example, the dynamic validation sequence may be the binary representation of 8, 1, 10, 3, 12, 5, 14, 7.

The video data detector 91 reads the data, if any, in the specified lines, corrects the data for correctable errors that may have occurred in the ISDW bits, and detects the presence of the ISDW. If the video data detector detects the presence of the ISDW, then the detector determines whether the ISDW is the first in the dynamic validation sequence. If not, then the video data detector 91 enters a fast acquisition mode, wherein the detector scans all lines of field one as quickly as possible to find the first ISDW in the dynamic validation sequence. If the first ISDW is found, then the video data detector shifts whichever line upon which the first ISDW is present to the first line of the horizontal overscan portion of the video signal. In an exemplary embodiment, the video detector sets the line equal to line 23 of field one. This eliminates any vertical shifting that may have occurred during transmission.

If the video data detector 91 does not detect the first ISDW of the dynamic validation sequence on any line in field one, then the detector performs the same search on all lines within field two. If the first ISDW of the dynamic validation sequence is detected on any line in field two, then the fields are swapped and the line containing the first ISDW moved to the position equating to that of the first line of the horizontal overscan region. Thus, the video data detector 91 may counteract signal errors caused by field swapping as well as vertical shifting.

In each field, the ISDW is typically followed by a number of content words. If the video data detector 91 detects the presence of the ISDW in the encoded video signal 104, it extracts the content words from the encoded video signal and assembles the content words into a serial data communication signal 106. The video data detector 91 then transmits the serial data communication signal 106 to a data error processor 99.

The data error processor 99 strips out the error correction bits, corrects any correctable errors in the content bits, and assembles the corrected content words into a 9-bit error corrected data stream. This 9-bit error corrected data stream is transmitted to a protocol handler 93, which includes a number of data handlers that detect and route device-specific control data to associated controlled devices 60 as described above. The addressing protocol for the content data is described with reference to U.S. application Ser. No. 08/795,710 entitled "PROTOCOL FOR A WIRELESS CONTROL SYSTEM" filed on Feb. 4, 1997, which is assigned to a common assignee and incorporated herein by reference.

Although the various components and modules have been described separately, one skilled in the art should recognize that the components and modules could be combined in various ways and that new program components and modules could be created to accomplish similar results.

Creating and Using an Encoded Video Signal

Figure 5:
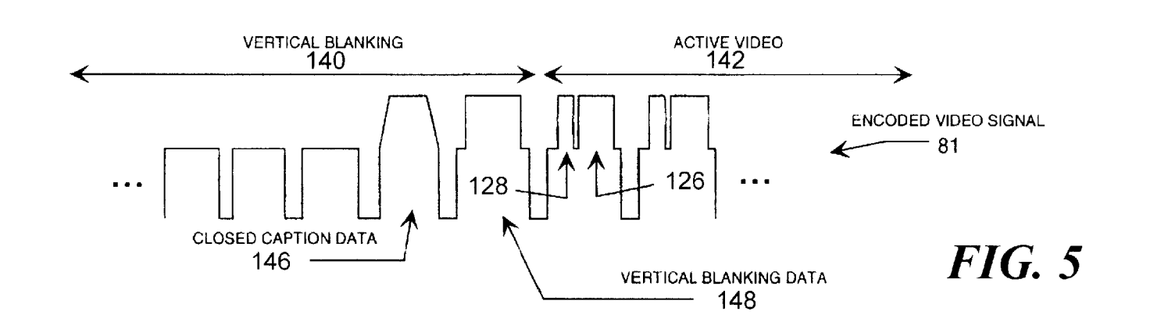
FIG. 5 is a wave form diagram illustrating a data bit value "one" encoded in the horizontal overscan portion of a scan line of an encoded video signal.
Figure 6:
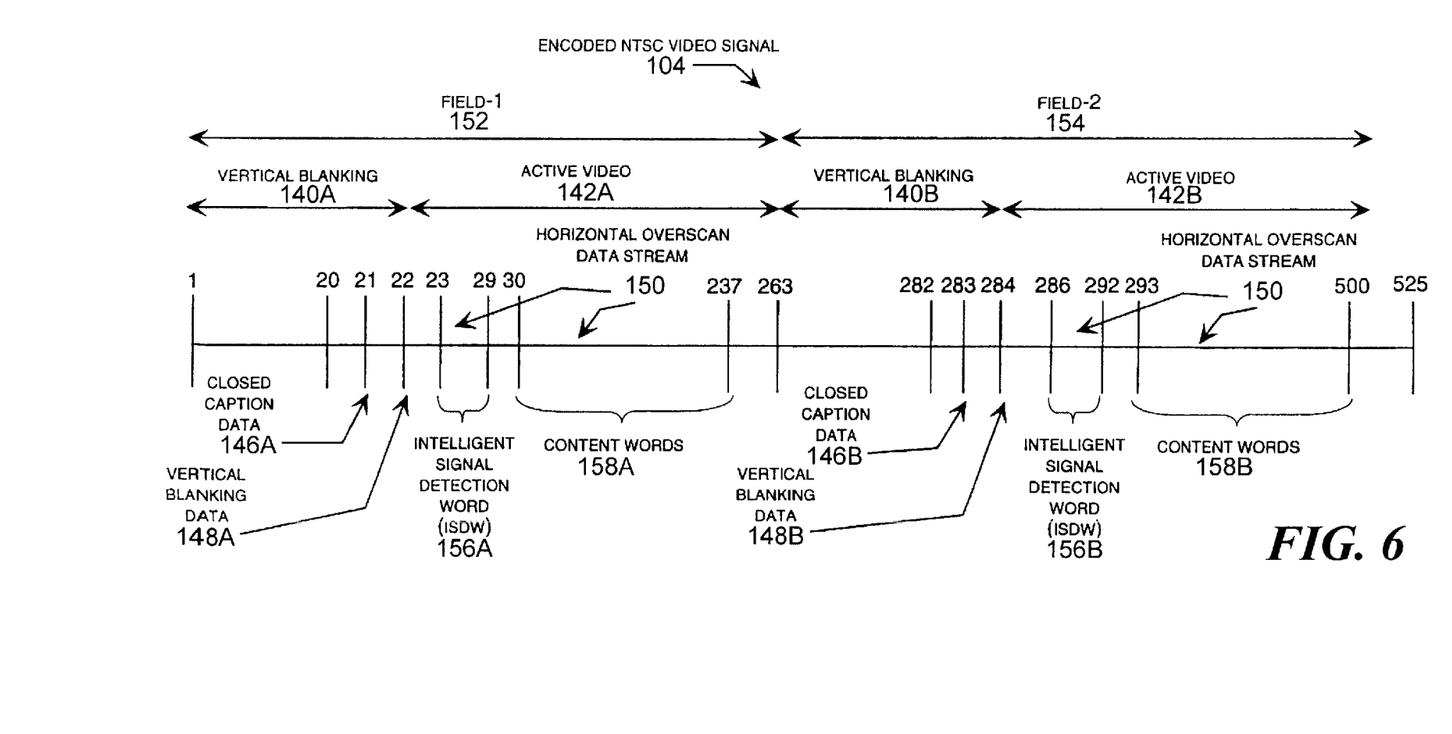
FIG. 6 is a wave form diagram illustrating a data bit value "zero" encoded in the horizontal overscan portion of a scan line of an encoded video signal.

FIGS. 5 and 6 show the location of the encoded data in the context of a single scan line of the encoded video signal 104. FIG. 5 is a wave form diagram illustrating a data bit value "one" 128 encoded in the horizontal overscan portion of a scan line of the encoded video signal 104. The scan line represents one line of one field displayed on the display device 35. The vertical axis represents the magnitude of the signal wave form 120 in units of IRE and the horizontal axis represents time in micro-seconds, as is familiar to those skilled in the art. Although FIGS. 5 and 6 are not drawn precisely to scale, important reference points are marked in the units of their corresponding axis. The wave form 120 for the scan line begins with a horizontal synchronization pulse 122 down to −40 IRE, which is a timing signal that indicates the beginning of the scan line (i.e., time=0) when the leading edge of the pulse passes through −20 IRE to establish the horizontal reference point "H-REF." The horizontal synchronization pulse 122 is followed by a sinusoidal color burst 124 (the approximate envelope is shown), which is used as a calibration signal for the display device 35. The color burst 124 is followed by a wave form representing the visible raster 126 (the approximate envelope is shown), which creates and typically overlaps slightly the visible image on the display device 35.

The wave form 120 includes a pre-visible horizontal overscan area 127, approximately from 9.2 micro-seconds to 10.2 micro-seconds after H-REF, that occurs after the color burst 124 and before the visible raster 126. The video data encoder 76 locates a pre-visible (i.e., before the visible raster 126) data bit "one" 128 by driving the wave form 120 to a predetermined high value, such as 80 IRE, in the interval from 9.2 micro-seconds to 10.2 micro-seconds after H-REF. Because the pulse denoting the data bit "one" 128 occurs after the calibration interval of the color burst 124 and before the visible raster 126, it does not interfere with the operation of the display device 35 or appear on the image displayed.

FIG. 6 is a wave form diagram illustrating a data bit value "zero" 128' encoded in the horizontal overscan portion of a scan line of the encoded video signal 104. The video data encoder 76 locates the pre-visible data bit "zero" 128 ' by driving the wave form 120 to a predetermined low value, such as 7.5 IRE, in the interval from 9.2 micro-seconds to 10.2 micro-seconds after H-REF.

As noted above, each 16-bit content word includes nine data bits, and each field includes 13 content words. Thus, encoding one bit per scan line produces a bandwidth for the data encoded in a typical 59.94 Hertz NTSC video signal of 7,013 Baud. This bandwidth is sufficient to provide the controlled device 60 with sufficient data to control several wireless controlled devices 60 in the manner described above. See also, the related patent application, U.S. application Ser. No. 08/795,710 entitled "PROTOCOL FOR A WIRELESS CONTROL SYSTEM" filed on Feb. 4, 1997, which is assigned to a common assignee and incorporated herein by reference.

The 7,013 Baud one-bit-per-scan-line bandwidth of the encoded data is also sufficient to control several other wireless controlled devices 60 to provide additional services, such as advertising, subscription, and emergency warning information for transmission to the display device 35 or other possible display elements. For example, these services might include e-mail, foreign language subtitling, intercom capability, telephone pages, weather warnings, configuration data for a set-top box, and so forth. At present, the 7,013 Baud one-bit-per-scan-line bandwidth is preferred because it provides sufficient bandwidth for the "REALMATION" system and minimizes the cost of the system components, in particular the video data encoder 76 and the video data detector 91. The bandwidth may be increased, however, by locating a second pulse in the post-visual horizontal overscan area 130, which occurs after the visible raster 126 and before the horizontal blanking interval 132 (during which the electron gun in the CRT of the display device 35 sweeps back from the end of the just completed scan line to the beginning of the next scan line).

And the bandwidth may be further increased by enabling each pulse 128, 130 to represent more that just two (1,0) states. For example, for 3 states (c.f., the 1.0, 1.5, 2.0 DDM pulse widths), an analog of the "REALMATION" DDM protocol could be used. For 4 states, the pulse could represent 2 bits (e.g., 100–80 IRE=1,1; 70–50 IRE=1,0; 40–20 IRE=0,0; 10 to −40 IRE=0,1). For 8 states, the pulse could represent 3 bits; for 16 states, the pulse could represent 4 bits, and so forth. For example, if the system 100 were to employ data pulses in both the pre-visual horizontal overscan area 127 and the post-visual horizontal overscan area

130, each data pulse having 16 states, each scan line would be able to transmit eight bits. This would increase the bandwidth from 7,013 Baud to 56,104 Baud, which might be worth the increased cost for the video data encoder 76 and the video data detector 91 for future applications.

Figure 7:
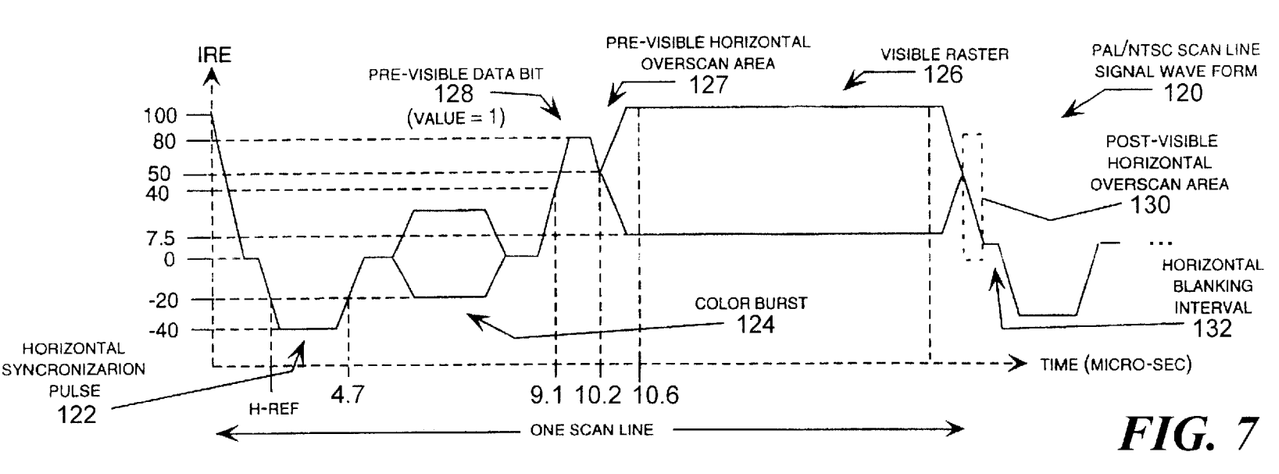
FIG. 7 is a diagram illustrating the location of data bits in a portion of a field of an encoded video signal.
Figure 8:
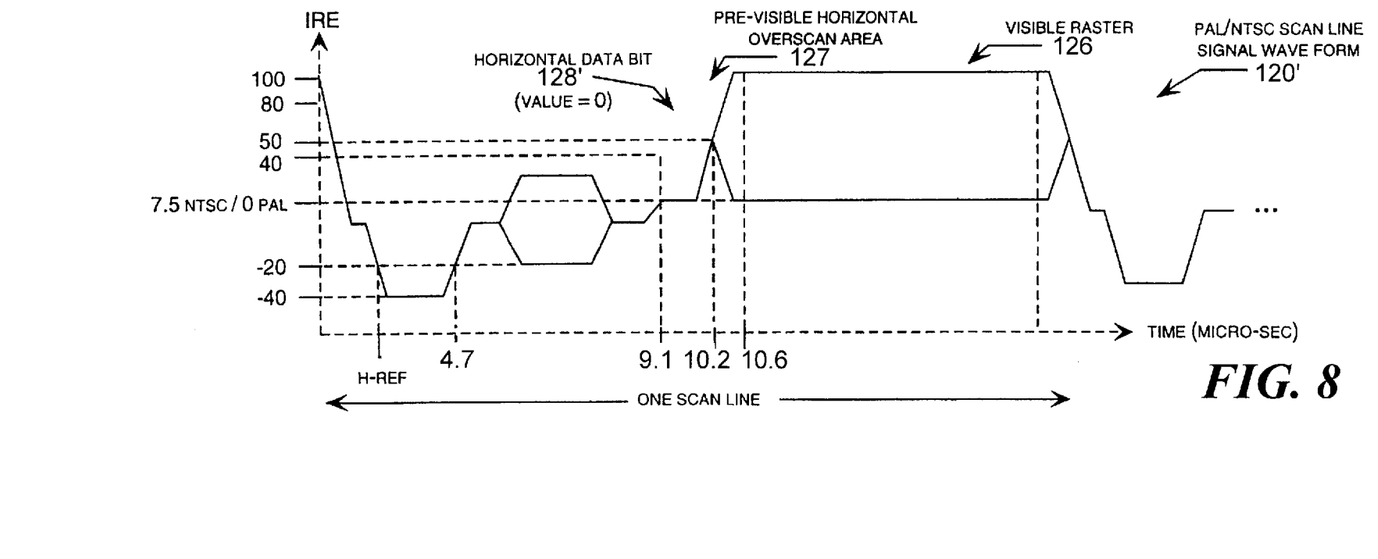
FIG. 8 is a diagram illustrating the location of data bits in two interlaced fields of a field of an encoded video signal.

FIGS. 7 and 8 show the location of encoded data in the context of a standard NTSC video frame. FIG. 7 is a diagram illustrating the location of data bits in a portion of a standard 525-line two-field interlaced NTSC video signal. Each field of the video data includes a vertical blanking interval 140 (during which the electron gun in the CRT of the display device 35 sweeps back and up from the end of the just completed field to the beginning of the next field) followed by an active video interval 142, which includes a number of left-to-right scan lines that sequentially paint the display device 35 from the top to the bottom of the screen. At the end of the vertical blanking interval 140, the last two pulses are typically reserved for closed caption data 146 and vertical blanking data 148, which may be already dedicated to other purposes. In addition, the bottom of each field is typically corrupted by head switching noise present in the output of helical-scan video tape players of consumer formats such as VHS and 8 mm. Therefore, the horizontal overscan portion of individual scan lines provides the preferred location for encoded data bits 128, 128' of the encoded video signal 104.

FIG. 8 is a diagram illustrating the location of data bits in the two interlaced fields of the standard NTSC video frame. That is, FIG. 7 shows the location of the encoded data in the context of a complete NTSC 525-line two-field interlaced video frame. The frame of video data includes lines 1–262 in field-1 152 interlaced with lines 263–525 in field-2 154. Field-1 152 includes a vertical blanking interval 140*a* and an active video interval 142*a*. The vertical blanking interval 140*a* includes lines 1–22 and concludes with line 21, which may include closed caption data 146*a,* and line 22, which may include vertical blanking data 148*a*. An ISDW 156*a* is encoded in lines 23–29 and content data 158*a* is encoded in lines 30–237. Field-2 154 includes a vertical blanking interval 140*b* and a active video interval 142*b*. The vertical blanking interval 140*b* includes lines 263–284 and concludes with line 283, which may include closed caption data 146*b,* and line 284, which may include vertical blanking data 148*b*. An ISDW 156*b* is encoded in lines 286–292 and content data 158*b* is encoded in lines 293–500.

Each ISDW preferably includes a plurality of data bits and a plurality of error correction bits defining a correction sequence that allows a single-bit error in the data bits to be detected and corrected. For example, the ISDW may include a seven-bit Hamming code (i.e., four data bits and three error correction bits) in the format shown below in Table 1.

TABLE 1

| Video Line Number | | | |
|---|---|---|---|
| Field 1 | Field 2 | Symbol | Description |
| 23 | 286 | Q0 | Sequence Word Bit 0 |
| 24 | 287 | Q1 | Sequence Word Bit 1 |
| 25 | 288 | Q2 | Sequence Word Bit 2 |
| 26 | 289 | Q3 | Sequence Word Bit 3 |
| 27 | 290 | B0 | B0 = Q1 × Q2 × Q3 |
| 28 | 291 | B1 | B1 = Q0 × Q1 × Q3 |
| 29 | 292 | B2 | B2 = Q0 × Q2 × Q3 |

In each field 152, 154 of a video field, up to 13 16-bit content words 158 may follow the ISDW 156, as shown below in Table 2.

TABLE 2

| Word Value Range | | |
|---|---|---|
| Field 1 | Field 2 | Defined Class |
| 30 | 293 | Start of Content Word 0 |
| 46 | 309 | Start of Content Word 1 |
| 62 | 325 | Start of Content Word 2 |
| 78 | 341 | Start of Content Word 3 |
| 94 | 357 | Start of Content Word 4 |
| 110 | 373 | Start of Content Word 5 |
| 126 | 389 | Start of Content Word 6 |
| 142 | 405 | Start of Content Word 7 |
| 158 | 421 | Start of Content Word 8 |
| 174 | 437 | Start of Content Word 9 |
| 190 | 453 | Start of Content Word 10 |
| 206 | 469 | Start of Content Word 11 |
| 222 | 485 | Start of Content Word 12 |
| 237 | 500 | End of Content Word 12 |
| 238–263 | 517–525 | Unused video lines |

Each content word preferably includes a plurality of data bits 164 and a plurality of error correction bits 166 defining a correction sequence that allows a single-bit error in the data bits to be detected and corrected. For example, the content word may include a seven-bit Hamming code (i.e., four data bits and three error correction bits) and a nine-bit Hamming code (i.e., five data bits and four error correction bits) in the format shown below in Table 3.

TABLE 3

| Offset from first line | Symbol | Description |
|---|---|---|
| +0 | M0 | Data Bit 0 |
| +1 | M1 | Data Bit 1 |
| +2 | M2 | Data Bit 2 |
| +3 | M3 | Data Bit 3 |
| +4 | B0 | B0 = M1 × M2 × M3 |
| +5 | B1 | B1 = M1 × M1 × M3 |
| +6 | B2 | B2 = M1 × M2 × M3 |
| +7 | M4 | Data Bit 4 |
| +8 | M5 | Data Bit 5 |
| +9 | M6 | Data Bit 6 |
| +10 | M7 | Data Bit 7 |
| +11 | M8 | Data Bit 8 |
| +12 | B3 | B3 = M4 × M5 × M6 × M7 |
| +13 | B4 | B4 = M4 × M5 × M7 × M8 |
| +14 | B5 | B5 = M4 × M6 × M7 × M8 |
| +15 | B6 | B6 = M5 × M6 × M7 × M8 |

Although many other, often more sophisticated, data correction techniques may be used, Hamming codes are preferred because of their simplicity and small computation requirement.

Extracting and Reordering an Encoded Video Signal

Figure 9:
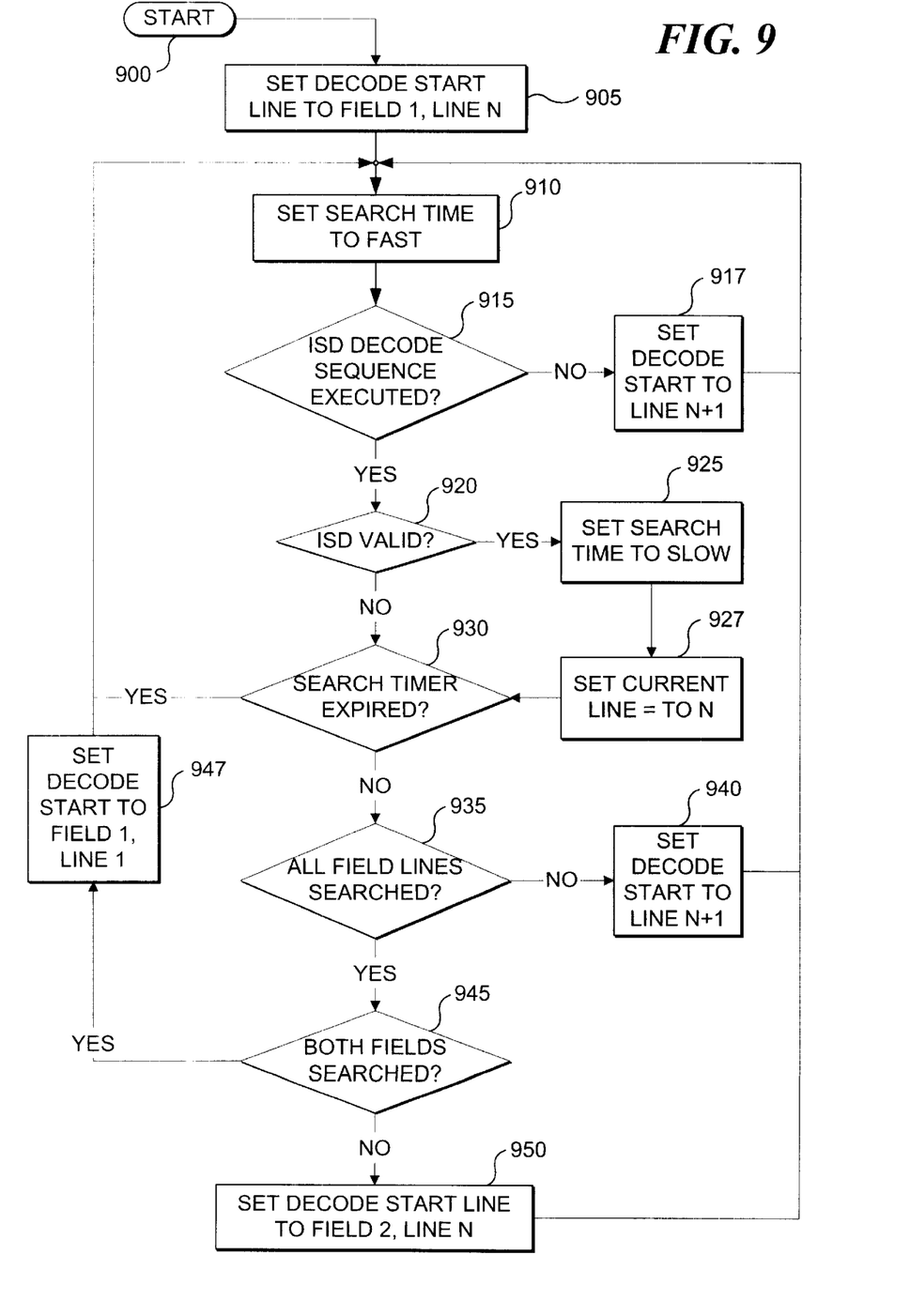
FIG. 9 is a logic diagram illustrating a method for retrieving encoded data from the horizontal overscan portion of a video signal.

FIG. 9 displays a flowchart displaying the steps executed when retrieving scrambled encoded data from a horizontal overscan portion of a video signal. The flowchart begins in start state 900. From start state 900, step 905 is accessed. In step 905, the control data retrieval system 10 begins the decoding procedure on the line N of field one. When step 905 is initially entered, N is the first line of a field which may contain an ISDW. In the exemplary embodiment, this is line 23, although alternate embodiments may set N equal to another line.

From step 905, step 910 is accessed. In step 910, the control data retrieval system 10 enters a fast acquisition mode. The system operates in one of two distinct acquisition modes, fast and slow. Fast mode is initiated when the control data retrieval system 10 has not detected the ISDW for a fixed period of time, and seeks to reacquire the ISDW quickly. Once the ISDW is again located, the system enters slow mode, wherein the ISDW polling frequency is dramatically decreased.

Following step 910, the control data retrieval system 10 enters step 915. In step 915, the system checks whether the ISDW decode sequence has been executed. The ISDW decode sequence is executed if the control data retrieval system 10 detects the intelligent signal detect word. In the event that the system has not detected the ISDW, then step 917 is entered.

In step 917, the control data retrieval system 10 sets the decode line to N+1, incrementing the line being searched by 1. Thus, if the ISDW decode sequence is not detected in step 915, the system prepares in step 917 to search the next line in sequence. Following step 917, the control data retrieval system 10 returns to step 910.

If the control data retrieval system 10 detects in step 915 that the ISDW decode sequence was executed, then step 920 is entered. The control data retrieval system 10 checks whether the ISDW is valid in step 920. That is, the system determines whether the configuration of the detected ISDW matches the data string comprising the first ISDW in the series. If so, then step 925 is accessed. Otherwise, the control data retrieval system 10 enters step 930.

In step 925, the control data retrieval system 10 sets the search time to slow, thus entering slow acquisition mode as discussed with respect to step 910. From step 925, step 927 is accessed. In step 927, the current line (that is, the line in which the ISDW beginning the ISDW sequence is found) is set as line N of field one. All subsequent lines are shifted accordingly. Thus, if the 29$^{th}$ line of field one contains the proper ISDW, that line is shifted up in the exemplary embodiment to line 23, as are all subsequent lines. Similarly, if line 31 of field two contains the initial ISDW, then not only is that line shifted to line 23, but the fields are swapped as well. This ensures that no matter where the initial ISDW is found, that line is always set as the first line of field one containing encoded data. In this manner, both vertical shifting and field swapping may be alleviated and the encoded data signal properly reconstructed.

In step 930, the control data retrieval system 10 determines whether the search timer has expired. The search timer measures the length of time elapsed since the control data retrieval system 10 last detected the ISDW. The length of time necessary for the search timer to expire is variable. Alternate embodiments may permit the time necessary for the search timer to expire to be set according to a user's desires. The expiration time is preferably longer than several minutes, in order to ensure that momentary service interruptions or commercial breaks in a program do not trigger search timer expiration. If the search time has expired, then the control data retrieval system 10 returns to step 910, with results as detailed above.

In the event that the search timer has not expired, the control data retrieval system 10 enters step 935. In step 935, the system determines whether all field lines have been searched. If the control data retrieval system 10 has already searched all lines in the current field, then the system accesses step 945. Otherwise, step 940 is entered and the control data retrieval system 10 sets the decode start line to line N+1. This increments the decode line by one, thus ensuring that the next pass through the search algorithm looks for the presence of the ISDW on the following line. After step 940, the control data retrieval system 10 returns to step 910 and the ISDW detection process begins again.

In step 945, the control data retrieval system 10 determines whether both field one and field two have been completely searched for the presence of the first ISDW in the decode sequence. If so, then step 947 is entered. If not, then step 950 is accessed.

In step 947, the control data retrieval system 10 must begin searching for the initial ISDW from line N of field one, insofar as the proper ISDW was not detected in any line of either field. Thus, the control data retrieval system 10 sets the decode start line to line 1 of field one in step 947. Following this step, the system enters step 910.

In step 950, the control data retrieval system 10 sets the decode start line to line N of field two. Once the system executes step 950, step 910 is entered. Note that the algorithm shown in FIG. 9 contains no end state. Rather, the algorithm is a closed repeating loop, constantly scanning for the presence of the first ISDW of an ISDW series.

CONCLUSION

Those skilled in the art will understand that the specific protocol illustrated in Tables 1–4 are just one example of many specific protocols that could be used to implement an addressing scheme using short addresses and long address in accordance with the present invention. In addition, the location of the data within the encoded video signal 104 may be varied somewhat without unduly affecting the performance of the system 100. In particular, Microsoft Corporation has been granted permission by the Federal Communications Commission to encode digital data in lines 23–257 in field-1 and lines 285–519 in field-2 of a standard 525 line NTSC television broadcast signal. As shown in FIG. 7 and Tables 1–4 above, the preferred protocol only utilizes lines 23–237 in field-1 and lines 286–500 in field-2. This enhances compatibility of the encoded video signal 104 with MPEG-based video compression algorithms, which typically exclude line 285 and include a compressed representation of only 480 visible scan lines.

The invention thus provides a method and system for encoding control data for wireless controlled devices in connection with a video signal so that the actions of the controlled devices operate in synchronism with the programming information defined by the video signal. Additional data may be transmitted encoded into the video signal for providing additional services, such as e-mail, foreign language subtitling, intercom capability, telephone pages, weather warnings, configuration data for a set-top box, and so forth. The protocol for the encoded data is addressable, forwardly compatible, error tolerant, and feasible to deploy in connection with a system that is primarily intended to be a children's entertainment product.

It should be understood that the foregoing relates only to specific embodiments of the invention, and that numerous changes may be made therein without departing from the spirit and scope of the invention as defined by the following claims.

What is claimed is:

1. A method for reordering digitally encoded video data, comprising:

receiving a plurality of fields, each field containing digitally encoded data;

checking a first field from the plurality of fields for the presence of an intelligent signal detect word;

determining whether the intelligent signal detect word begins a sequence;

in the event that the intelligent signal detect word begins a sequence, presenting the plurality of fields in the order received;

otherwise, determining whether a second field from the plurality of fields contains a second intelligent signal detect word;

determining whether the second intelligent signal detect word begins a sequence; and in response to determining that the second intelligent signal detect word begins a sequence, reordering the digitally encoded data in the series of fields.

2. The method of claim 1, wherein the first field comprises a first plurality of lines containing digitally encoded data and the second field comprises a second plurality of lines containing digitally encoded data.

3. The method of claim 2, wherein the step of checking a first field from the plurality of fields for the presence of an intelligent signal detect word comprises the steps of:

scanning a first line of the first plurality of lines for the presence of an intelligent signal detect word;

determining whether the intelligent signal detect word begins a sequence;

in the event that the signal detect word begins a sequence, presenting the digitally encoded data contained in the fields in the order received;

otherwise, incrementing a counter by one;

scanning the line of the first field corresponding to a count of the counter for the presence of the intelligent signal detect word;

determining whether the intelligent signal detect word begins a sequence;

in the event that the intelligent signal detect word begins a sequence, setting the line of the first field corresponding to the count of the counter as the first line; and otherwise, repeating the steps of incrementing the counter and scanning the line of the first field corresponding to the count of the counter for the presence of the intelligent signal detect word until the intelligent signal detect word beginning a sequence is found.

4. The method of claim 3, further comprising the steps of:

in the event that no signal detect word beginning a sequence is found in any line of the first plurality of lines are scanned, scanning a first line of the second plurality of lines for the presence of an intelligent signal detect word;

determining whether the intelligent signal detect word begins a sequence;

in the event that the signal detect word begins a sequence, presenting the fields in the order received;

otherwise, incrementing a counter by one;

scanning the line of the first field corresponding to a count of the counter for the presence of the intelligent signal detect word;

determining whether the intelligent signal detect word begins a sequence;

in the event that the intelligent signal detect word begins a sequence, setting the line of the first field corresponding to the count of the counter as the first line; and otherwise, repeating the steps of incrementing the counter and scanning the line of the first field corresponding to the count of the counter for the presence of the intelligent signal detect word until the intelligent signal detect word beginning a sequence is found.

5. The method of claim 4, further comprising the step of swapping the digitally encoded data contained in the first field and the digitally encoded data contained in the second field.

6. The method of claim 5, wherein the line containing the intelligent signal detect word beginning a sequence is set as line twenty-three on a television screen.

7. An instrument configured to execute the steps of claim 1.

8. An instrument configured to execute the steps of claim 6.

9. A computer-readable medium containing instructions that, when executed on a computer, perform the method of claim 1.

10. A method for detecting a first line of a data sequence encoded in a digital video signal, comprising the steps of:

(a) receiving a digital video signal having a first field and a second field, each field comprising a plurality of lines;

(b) scanning a first line of the first field for the presence of an intelligent signal detect word;

(c) in the event that the intelligent signal detect word is not found, incrementing a counter by one;

(d) scanning the line of the first field corresponding to a count of the counter for the presence of the intelligent signal detect word;

(e) repeating steps (c) and (d) until the intelligent signal detect word is found; and (f) flagging the line on which the intelligent signal detect word is found as a first data line.

11. The method of claim 10, further comprising the step of setting the first data line as line 23 of the video signal in response to flagging the line on which the intelligent signal detect word is found as a first data line.

12. The method of claim 10, further comprising the steps of:

(a) in the event that the count of the counter exceeds the number of lines in the first field, resetting the counter to 1;

(b) further in the event that the count of the counter exceeds the number of lines in the first field, scanning a first line of the second field for the presence of an intelligent signal detect word;

(c) in the event that the intelligent signal detect word is not found, incrementing the counter by one;

(d) scanning the line of the first field corresponding to the count of the counter for the presence of the intelligent signal detect word;

(e) repeating the steps of incrementing the counter by one and scanning the line of the first field corresponding to the counter until the intelligent signal detect word is found; and (f) flagging the line on which the intelligent signal detect word is found as the first data line.

13. The method of claim 12, further comprising the step of setting the first data line as line 23 of the first field of the video signal in response to flagging the line on which the intelligent signal detect word is found as the first data line.

14. The method of claim 13, further comprising the steps of:
  (a) in response to detecting the presence of the intelligent signal detect word, entering a slow search mode;
  (b) in the slow search mode, continuing to monitor the first line for the presence of the intelligent signal detect word; and
  (c) in the event that the intelligent signal detect word is not found for a predetermined period of time, entering a fast search mode.

15. The method of claim 14, wherein the predetermined time is greater than three minutes.

16. An apparatus configured to perform the method of claim 10.

17. A decoding device comprising a controller, for recovering data from a video signal divided into fields, wherein each field comprises a plurality of horizontal scan lines consecutively illuminated on a display device, wherein each scan line comprises a prescan portion comprising a pre-data encoding zone, wherein the controller scans the prescan portion for the presence of encoded data in the pre-data encoding zone over a plurality of subsequent fields, the controller being operable to perform the steps of:
  determining a plurality of horizontal scan lines within a prescan portion;
  searching the plurality of horizontal scan lines for the presence of a data start key;
  detecting a data start key within a horizontal scan line within the prescan portion; and
  setting the line containing the data start key as the first line of the pre-data encoding zone.

18. The decoding device of claim 17, wherein the data start key comprises a predefined intelligent signal detect word.

19. The decoding device of claim 17, wherein the prescan portion comprises a range between 8.8 and 11.0 microseconds from a horizontal synchronization pulse or a timing signal that indicates the beginning of a horizontal scan line.

20. The decoding device of claim 17, the controller being further operable to perform the steps of:
  entering a slow search mode in response to detecting the data start key;
  monitoring the presence of the data start key in the first horizontal scan line of the pre-data encoding zone; and
  in the event that the data start key is not present in the first horizontal scan line of the pre-data encoding zone for a predetermined time, entering a fast search mode.

21. The decoding device of claim 17, the controller being further operable to perform the step of repeating the step of searching the plurality of horizontal scan lines for the presence of a data start key until the data start key is detected, in response to entering a fast search mode.

22. In a system comprising a digital encoder, a transmitter, and a receiver, a method for receiving correctly ordered digital data, comprising the steps of:
  digitally encoding a data stream as a series of data packets;
  transmitting the data packets within a television signal, in order, from a first packet to a last packet, each packet being carried on a separate line;
  receiving the data packets;
  determining whether the data packets arrive in the same order as transmitted; and
  in the event that the data packets arrive in a different order, reordering the data packets to the order in which the data packets were transmitted.

* * * * *